March 17, 1931. J. H. SLAKER 1,796,309
ROTARY EARTH SCRAPER
Filed Dec. 24, 1926 3 Sheets-Sheet 1
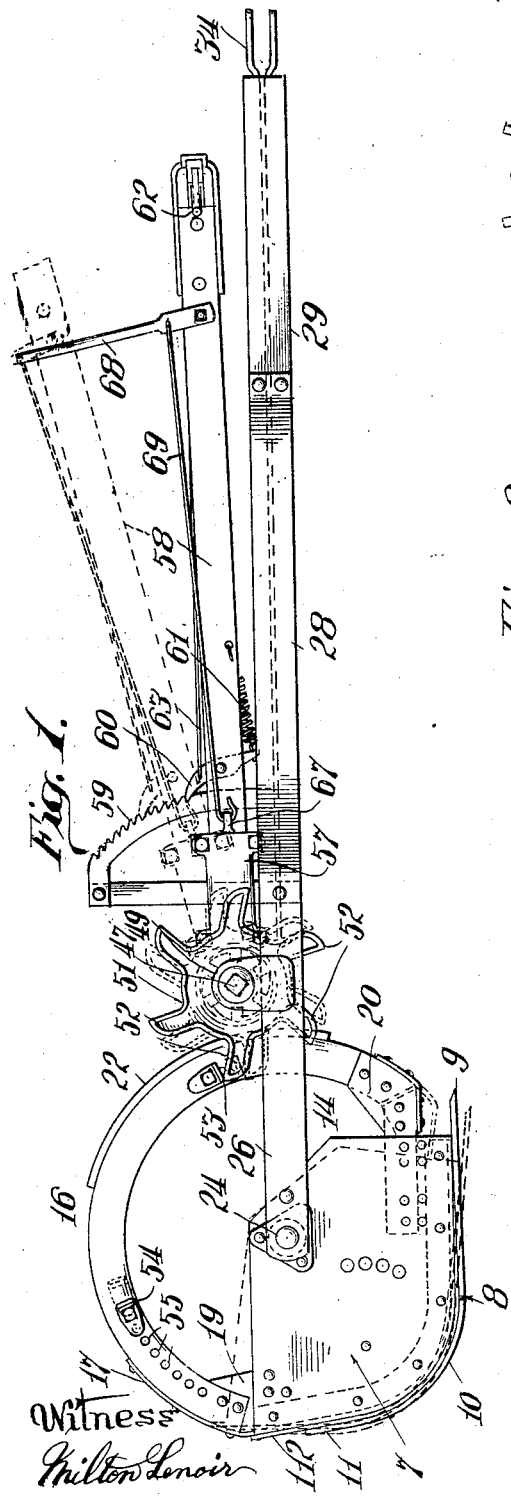
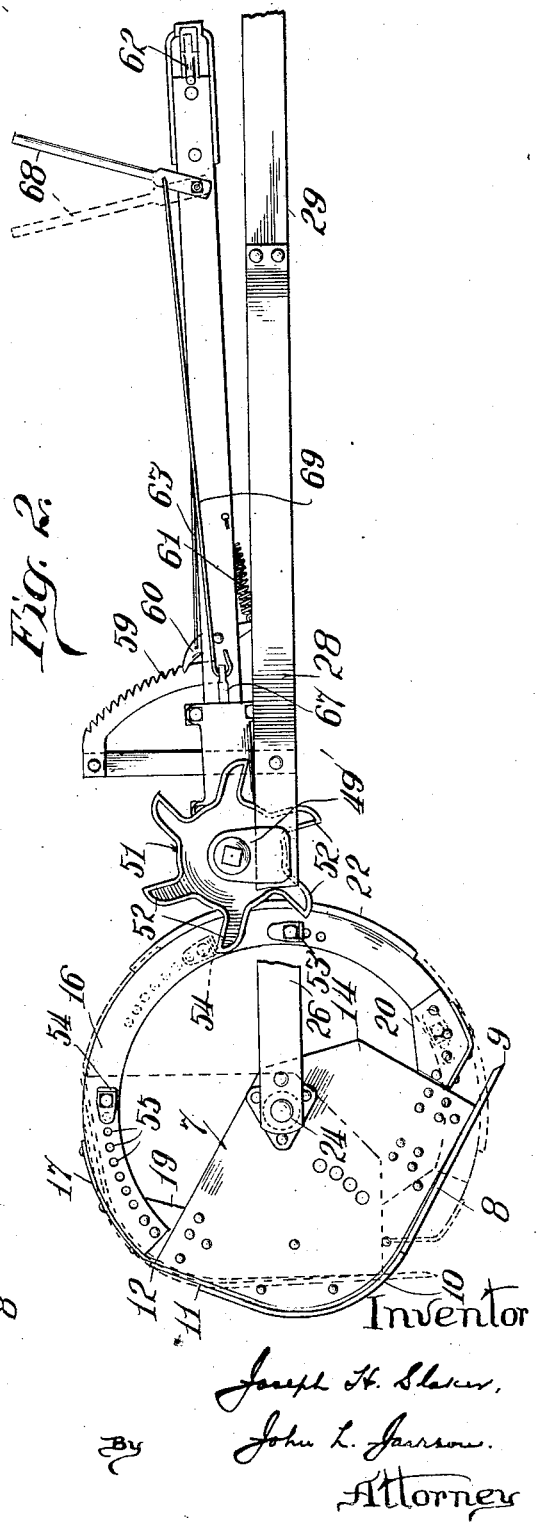

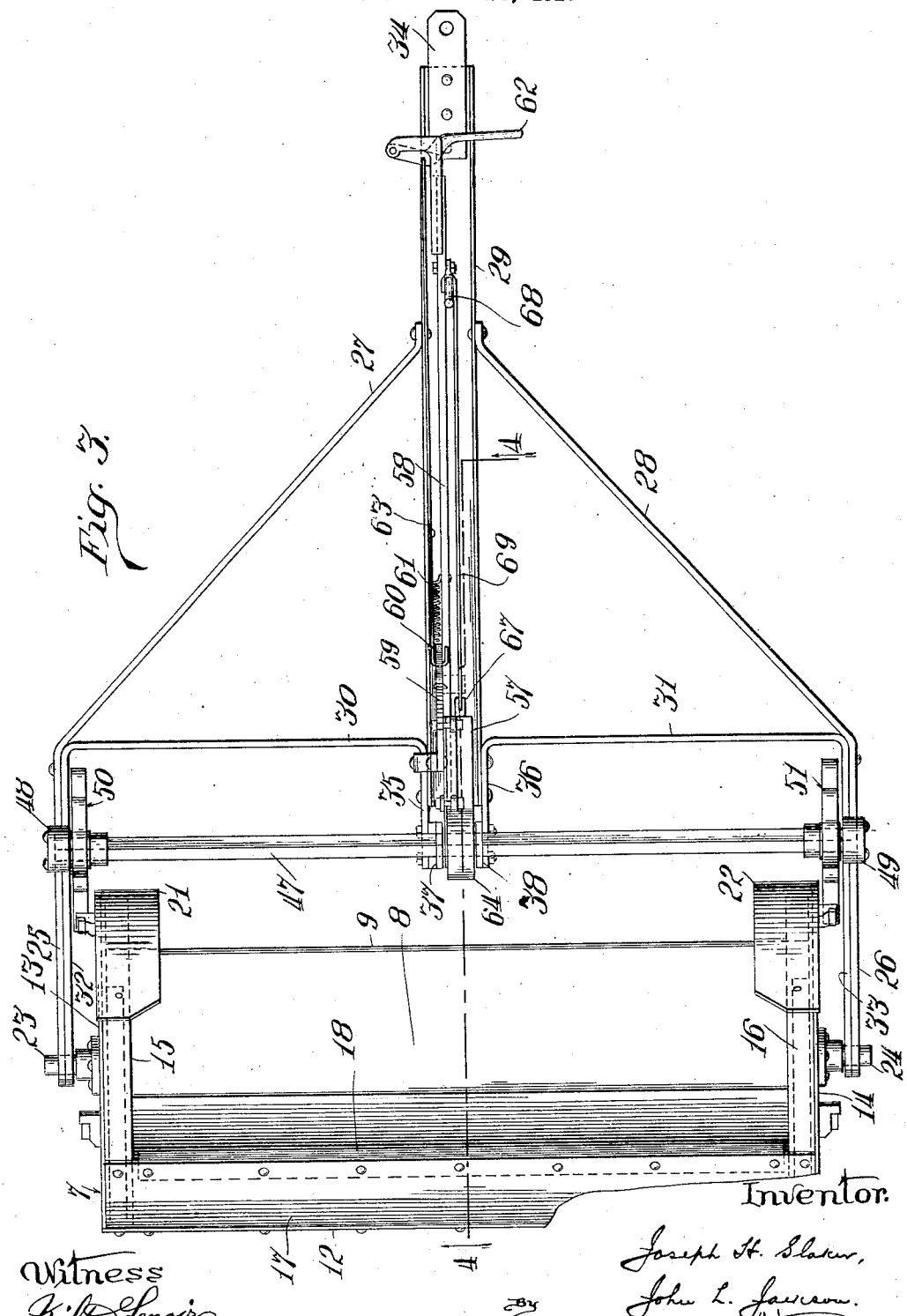

March 17, 1931. J. H. SLAKER 1,796,309
ROTARY EARTH SCRAPER
Filed Dec. 24, 1926 3 Sheets-Sheet 3
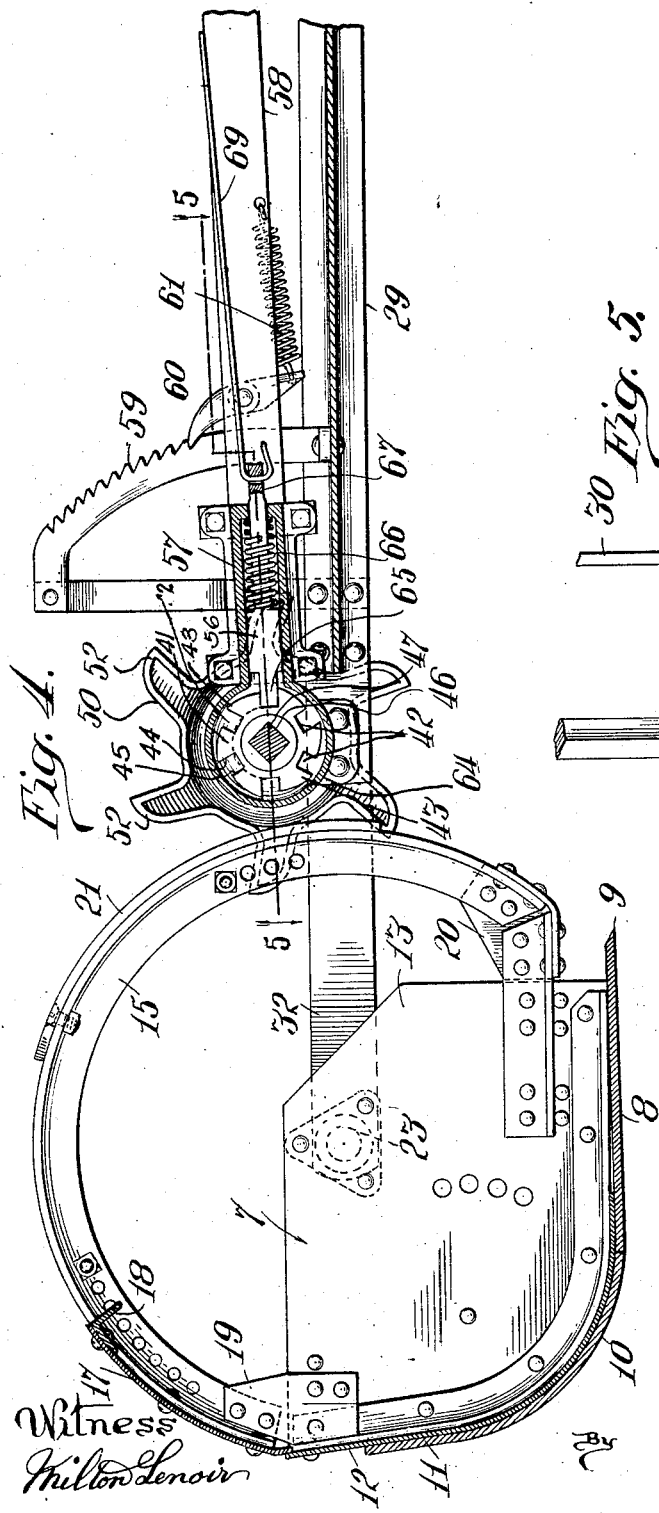
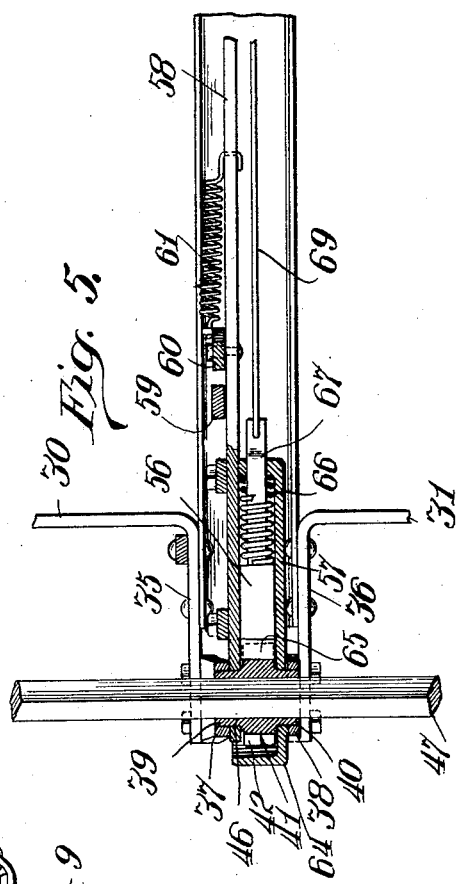
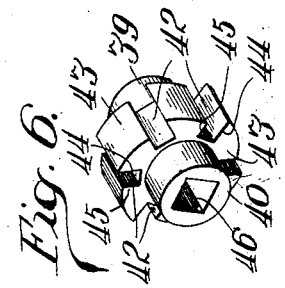

Patented Mar. 17, 1931

1,796,309

UNITED STATES PATENT OFFICE

JOSEPH H. SLAKER, OF AURORA, ILLINOIS, ASSIGNOR TO WESTERN WHEELED SCRAPER COMPANY, OF AURORA, ILLINOIS, A CORPORATION OF ILLINOIS

ROTARY EARTH SCRAPER

Application filed December 24, 1926. Serial No. 156,784.

My invention relates to earth scrapers of the type known as the "Fresno", characterized by the provision of a scoop or pan having a scraping front edge and provided at its sides with upwardly extending arcuate members that are adapted to roll on the ground when the pan moves from its loading to its load distributing or dumping positions, and on which it rolls completely over about a transverse axis in returning to its transport position. In the latter position the pan rides on the rounded rear portion of its bottom, which is then tilted upwardly toward the front so that its scraping edge clears the ground, thereby permitting the scraper to be hauled to the place of loading without taking up earth, or to the dumping place without spilling its load. When the pan is to be loaded it is necessary to tilt it sufficiently to bring its cutting edge into position to take up earth, and after it has been loaded, to return it to its transport position for conveying the load to the place where it is to be deposited. Also as a part of the dumping operation the pan must be held with its bottom in an approximately upright position so that the load may be properly distributed. Scrapers of this type are usually hauled either by a tractor or by a team, and when hauled by a tractor it is desirable that the several positions of the pan may be controlled by an operator on the tractor.

The object of my present invention is to provide a scraper of this type with improved means for controlling the operation of the pan, which may readily be manipulated from a tractor, although such improvements may also be applied to scrapers designed to be hauled by a team. I accomplish this object as illustrated in the drawings and hereinafter described. What I regard as new is set forth in the claims.

In the accompanying drawings which illustrate the preferred embodiment of my invention,—

Fig. 1 is a side elevation showing the pan in full lines in its transport position, its loading position being indicated in dotted lines;

Fig. 2 is a similar view showing in full lines the beginning of the dumping position of the pan, and in dotted lines its load distributing position;

Fig. 3 is a plan view with some parts broken away;

Fig. 4 is an enlarged longitudinal sectional view on line 4—4 of Fig. 3;

Fig. 5 is a horizontal sectional view of some parts of the control mechanism taken on line 5—5 of Fig. 4; and Fig. 6 is a perspective view of the rotatable latch that forms a part of the control mechanism.

Referring to the drawings, 7 indicates the scraper pan, which may be constructed in any desired way, and comprises a bottom plate 8 having a front cutting edge 9. Said bottom plate is provided at the rear with an extension plate 12 that is rounded and extends upwardly, as shown at 11 in Fig. 4, to form the back wall of the pan. Preferably said back wall is reenforced by a plate 11 that overlies the rounded portion 10 and serves as a runner on which the pan rides during transportation of the load. The pan is also provided with side plates 13, 14 firmly secured to the side marginal portions of the plate 8, and with upwardly extending arcuate members 15, 16, preferably formed of angle iron and firmly secured to the pan in any suitable way, as by riveting their ends to the side plates 13, 14, as best shown in Fig. 4, although, if desired, they may be formed by extending the side plates upwardly and rounding their upper margins. These arcuate members extend up above the side members 13, 14, and also forward of the cutting edge 9, and their curvature is such that when the pan is rotated in the dumping operation, and in returning it to its transport position, it rides on the outer surfaces of said arcuate members. Said arcuate members also serve as supports for a curved plate 17 that forms an upward extension of the plate 12, thereby increasing the capacity of the pan. The end portions of the plate 17 are fixedly secured to the arcuate members 15, 16, and its upper margin is reenforced by a transverse angle bar 18 that is secured thereto, as shown in Fig. 4. In the illustrated construction the arcuate members 15, 16 are shown as made up of several parts joined together by connecting plates 19, 20, but if desired each of said arcuate members may be made of a continuous piece of angle iron. Also said arcuate members are preferably provided with curved shoes 21, 22 which are somewhat wider than the flanges of said members to which they are secured, and are so located that they furnish wider tread surfaces for engagement with the ground during the principal part of the dumping operation, to better sustain the pan at that time and prevent the arcuate members from cutting into the soil, which is usually loose at the dumping ground. The shoes 21, 22 are preferably removably secured in place, so that if desired they can be demounted without difficulty.

As best shown in Fig. 3, the scraper pan is provided at its opposite sides with trunnions 23, 24 secured in axial alinement with each other to the opposite side plates 13, 14, and projecting outwardly therefrom, to form pivotal supports about which the pan may rotate. These trunnions are journaled in suitable bearings in side bars 25, 26 of a draft frame through which the pan is connected to the draft power, and which serves also to support the control mechanism by which the position of the pan is regulated. As best shown in Fig. 3, the side bars 25, 26 have forwardly converging front end portions 27, 28 that are connected with a draft beam or tongue 29, preferably in the form of an I-beam with its web portion disposed horizontally. The rear end portion of the tongue 29 is connected with transverse bars 30, 31, which at their outer ends are bent rearwardly to provide side members 32, 33 that are firmly connected with the side bars 25, 26, respectively. The side members 32, 33 are also provided with bearings at their rear ends, which receive the trunnions 23, 24. By this construction a rigid draft frame is provided, between the end portions of which the pan may rotate, and by which it may be hauled from place to place. At the front end of the tongue a clevis 34, or some other suitable form of draft connection, is provided for hitching it to a tractor or other draft power.

As best shown in Fig. 3, the inner end portions of the transverse bars 30, 31 are bent rearwardly to provide arms 35, 36 that are connected at opposite sides with the rear end portion of the tongue, and extend rearwardly beyond the same, as best shown in Fig. 5. These arms support upwardly extending brackets 37, 38 that are preferably secured to their inner faces and are provided with bearings in which are journaled the opposite end portions 39, 40 of the hub of a rotatable latch 41 best shown in Fig. 6. This latch is in the form of a wheel the peripheral portion of which is provided with transverse notches 42 spaced preferably at regular intervals around the wheel. The peripheries of the projections 43 left by cutting out the notches 42 are not curved concentrically with the hub of the wheel, but are made somewhat eccentric, to provide a wall 44 at one side of each notch that is higher than the opposite wall 45 thereof. This feature is best shown in Fig. 4, and the purpose of such arrangement is to facilitate the engagement of the locking dog hereinafter described with said wheel. It may be explained here, however, that the wheel rotates principally in a counterclockwise direction as viewed in Fig. 4, and, therefore, the lower walls 45 of the several notches are in advance of the higher walls 44 thereof.

The hub of the latch 41 is provided with a passage 46 that is preferably made polygonal, and extending through said passage is a shaft 47 which consequently rotates with the latch. This shaft extends transversely of the draft frame, and its ends are mounted in suitable bearings formed in brackets 48, 49 secured to the side bars 25, 26 in proximity to the arcuate members 15, 16. Mounted upon the end portions of the shaft 47 to rotate therewith are two stop wheels 50, 51, said wheels being provided with a series of sprockets 52, and said wheels are so located that the rearwardly projecting sprockets thereof extend alongside of the outer faces of the arcuate members 15, 16, respectively, in position to intercept one or the other of two or more stops 53, 54 secured to the outer faces of said arcuate members, as best shown in Fig. 1. The two stops carried by a given arcuate member are located approximately ninety degrees apart, and preferably they are adjustably secured so that the space between the two stops may be varied. For this purpose a plurality of holes 55 are provided in the arcuate members, as shown in Fig. 1. It will be apparent that if the stop wheels 50, 51 be held against rotation, and one or the other of the stops 53, 54 is in engagement with the rearwardly projecting sprockets of said wheels, the scraper pan will be held against rotation in a clockwise direction as viewed in Fig. 1. By releasing the stop wheels, however, rotation of the pan will be permitted.

The shaft 47 and the stop wheels carried by it are normally held against rotation by means of a dog 56 mounted to slide in a housing 57 that is carried by a vertically swinging lever 58 fulcrumed on the end portion 39 of the latch 41, as best shown in Fig. 5. Said lever extends forward over the tongue 39, and is normally locked against upward movement by a ratchet toothed sector 59 secured to the tongue, as best shown in Figs. 1 and 2, and a pawl 60 pivotally mounted on the lever and normally held in engagement with the teeth of said sector by a spring 61. The pawl 60 may be moved out of engagement with the sector by means of a latch lever 62 mounted on the front end portion of the lever 58 and connected with said pawl by a rod 63. The housing 57 is preferably journaled on the hub portion 40 of the latch 41, and at its rear end has a curved portion 64 that practically encloses the latch 41, thereby protecting it against the admission of dirt.

The dog 56 has a rearwardly extending tooth 65 that is adapted to enter the notches 42 in the latch, to hold said latch against rotating independently of the lever 58, and said dog is normally held in operative position by a spring 66 mounted upon a forwardly projecting stem 67 carried by said dog, as best shown in Fig. 5. The dog 56 may be moved forwardly out of engagement with the latch 41, by a lever 68 mounted on the forward portion of the lever 58 and connected with the stem 67 by a rod 69, as best shown in Fig. 5.

The operation is as follows: Normally the latch 41 is locked against rotation by the dog 56 through the engagement of its tooth 65 with one of the notches 42. This holds the shaft 47 and stop wheels 50, 51 against rotation. Therefore, if one or the other pair of stops 53, 54 carried by the arcuate members 15, 16 are in engagement with the rearwardly projecting sprockets of said stop wheels the pan will be held against rotation. The arrangement is such that when the pair of stops 53 engage such rearwardly projecting sprockets, as in the illustration of Fig. 1, the pan will be held either in its transport position or in its loading position, depending on the position of the control lever 58. When said lever is in its lowermost position the rearwardly projecting sprockets of the stop wheels will be approximately horizontal, and the pan will be held in its transport position, but by swinging the control lever 58 upward without releasing the dog 56 from the latch wheel 41, said latch will be rotated in a counter-clockwise direction as viewed in Fig. 4, thereby swinging the rearwardly projecting sprockets of the stop wheels downward sufficiently to lower the cutting edge of the pan into position to take up earth and load the pan as the scraper is drawn forward. After the pan has been loaded the control lever 58 is moved downward, thereby turning the latch 41 and stop wheels 50, 51 in a clockwise direction, which, through the engagement of their rearwardly projecting sprockets with the stops 53, turns the pan in a counterclockwise direction, thereby restoring it to its transport position.

When the dumping place is reached the operator actuates the lever 68 to withdraw the dog 56 from engagement with the latch 41, which permits free rotation of said latch, the shaft 47 and the stop wheels 50, 51, and consequently the pan is released so that it may rotate in a clockwise direction as the scraper is drawn forward. However, immediately after the pan begins to dump the operator releases the lever 68, thereby again locking the latch 41 against rotation, and holding the next succeeding sprockets of the stop wheels in position to intercept the stops 54 when the pan shall have turned through an arc of approximately ninety degrees, bringing it to its load distributing position. After the load has been distributed the operator again actuates lever 68 to release the latch 41, whereupon the rotation of the pan is resumed and it turns completely over, being stopped in its transport position by one or another of the sprockets of the stop wheels, which by that time will have been again locked against rotation by the engagement of the dog 56 with the latch wheel 41. When the latch 41 rotates the end of the tooth 65 rides on the outer surfaces of the projections 43, and it will be evident that by making the outer surfaces of said projections eccentric as described, said tooth is directed into engagement with the notches 42. Also the higher rear walls of said notches prevent said tooth from accidentally jumping over such notches. I have shown the stop wheels 50, 51 as being provided with six sprockets, but their number may be varied considerably, as it is essential only that a sufficient number be provided to enable the operation of the pan to be properly controlled. It will be seen that the construction described is quite simple, but nevertheless it provides for positively holding the pan in its transport, loading and distributing positions, and also makes it an easy matter to adjust such positions over a comparatively wide range.

What I claim as my invention and desire to secure by Letters Patent, is—

1. An earth scraper of the type described comprising a draft frame, a pan pivotally connected therewith and having upwardly extending arcuate means secured thereto to rotate therewith, a swinging lever mounted on the draft frame, a rotatable latch adapted to rotate independently of said lever and arranged to revolve through a complete revolution, controllable means for holding said latch against such independent rotation, and rotatable means controlled by said latch for holding the pan against rotation.

2. An earth scraper of the type described comprising a draft frame, a pan pivotally connected therewith and having upwardly extending arcuate means secured thereto to rotate therewith, a swinging lever mounted on the draft frame, a rotatable latch adapted to rotate independently of said lever, controllable means for holding said latch against such independent rotation, and a rotatable stop mounted on the draft frame and arranged to revolve through a complete revolution, said stop being controlled by said latch for holding the pan against rotation.

3. An earth scraper of the type described comprising a draft frame, a pan pivotally connected therewith and having upwardly extending arcuate means secured thereto to rotate therewith, a control lever, a rotatable latch mounted on the draft frame, locking means carried by said lever operable either to permit or to prevent rotation of said latch independently of said lever, and a rotatable stop wheel controlled by said latch for holding the pan against rotation, said latch wheel permitting successive step-by-step rotation of said stop wheel.

4. An earth scraper of the type described comprising a draft frame, a pan pivotally connected therewith and having upwardly extending arcuate means secured thereto to rotate therewith, a control lever, a rotatable latch wheel mounted on the draft frame, locking means operable either to permit or to prevent rotation of said latch wheel independently of said lever, and a rotatable stop wheel controlled by said latch wheel for holding the pan against rotation, said latch wheel permitting successive step-by-step rotation of said stop wheel throughout a complete revolution thereof.

5. An earth scraper of the type described comprising a draft frame, a pan pivotally connected therewith and having upwardly extending arcuate means secured thereto to rotate therewith, a control lever, a rotatable latch arranged to turn through a complete revolution mounted on the draft frame and having a plurality of notches, a locking dog carried by said lever movable into or out of engagement with said notches to permit or to prevent rotation of said latch independently of said lever, and a rotatable stop controlled by said latch for holding the pan against rotation.

6. An earth scraper of the type described comprising a draft frame, a pan pivotally connected therewith and having upwardly extending arcuate means secured thereto to rotate therewith, a vertically swinging control lever mounted on the draft frame, a rotatable latch mounted on the draft frame and having a plurality of notches in its periphery provided with radial walls of different heights, a dog carried by said lever adapted to engage or disengage said notches, to permit or to prevent rotation of said latch independently of said lever, and a rotatable stop controlled by said latch for holding the pan against rotation.

7. An earth scraper of the type described comprising a draft frame, a pan pivotally connected therewith and having upwardly extending arcuate means secured thereto to rotate therewith, a control lever mounted on the draft frame, a rotatable latch, locking means operable either to permit or to prevent rotation of said latch independently of said lever, stop wheels controlled by said latch, said wheels being provided with a series of sprockets, and means carried by the pan and adapted to cooperate with each of said sprockets successively to hold the pan against rotation.

8. An earth scraper of the type described comprising a draft frame, a pan pivotally connected therewith and having upwardly extending arcuate means secured thereto to rotate therewith, a control lever, a rotatable latch wheel having a plurality of notches mounted on the draft frame, a dog mounted on said lever adapted to cooperate with the notches of said latch wheel successively to permit or to prevent rotation thereof independently of said lever, tripping means mounted on said lever for tripping said dog, and means controlled by said latch wheel for holding said pan against rotation.

9. An earth scraper of the type described comprising a draft frame, a pan pivotally connected therewith and having upwardly extending arcuate means secured thereto to rotate therewith, a rotatable shaft extending transversely of said frame and arranged to revolve through a complete revolution, a control lever swinging about the axis of said shaft, latch means for releasably connecting said lever to said shaft, and means controlled by the rotation of said shaft for holding said pan against rotation.

10. An earth scraper of the type described comprising a draft frame, a pan pivotally connected therewith and having upwardly extending arcuate means secured thereto to rotate therewith, a rotatable shaft extending transversely of said frame and arranged to revolve through a complete revolution, a latch wheel secured to said shaft intermediate the ends thereof, a control lever, means for releasably connecting said lever to said latch wheel to permit or to prevent rotation of said wheel independently of movement of said lever, toothed stop wheels mounted on the end portions of said shaft, and means carried by the pan and adapted to cooperate with the teeth on said stop wheels to hold the pan against rotation.

11. An earth scraper of the type described comprising a draft frame, a pan pivotally connected therewith and having upwardly extending arcuate means secured thereto to rotate therewith, a rotatable shaft extending transversely of said frame in front of said pan, stationary bearings mounted on said frame for the end portions of said shaft, a latch wheel secured to said shaft intermediate its ends, said latch wheel having a plurality of notches therein, a control lever mounted to swing about the axis of said shaft, a releasable locking member on said lever adapted to engage in the notches of said latch wheel to permit or to prevent rotation of said wheel independently of said lever, housing means mounted on said lever substantially enclosing said latch wheel and said locking member, means for holding said lever in different vertical positions of adjustment, stop wheels mounted on the end portions of said shaft, said wheels being provided with a series of sprockets, and means carried by the pan and adapted to cooperate with said sprockets to hold the pan against rotation.

12. An earth scraper of the type described comprising a draft frame, a pan pivotally connected therewith and having upwardly extending arcuate members secured thereto to rotate therewith, stop means rotating about a fixed axis on said frame and cooperating with shoulders on said pan for controlling the angle of said pan and for holding the same against rotation, said stop means rotating with a step-by-step rotation through successive revolutions with repeated operations of tripping said pan, and a swinging lever for rocking said stop means or for permitting rotation thereof.

JOSEPH H. SLAKER.